US009853748B2

United States Patent
Prendergast et al.

(10) Patent No.: US 9,853,748 B2
(45) Date of Patent: Dec. 26, 2017

(54) SYSTEMS AND METHODS FOR CONTROLLING RADIO TRANSMIT POWER FOR INFORMATION HANDLING SYSTEMS BASED ON SYSTEM-SPECIFIC RF PARAMETERS

(71) Applicants: Liam Prendergast, Limerick (IE); Brian O'Loughlin, Bruff (IE); Michael Heelan, Askeaton (IE)

(72) Inventors: Liam Prendergast, Limerick (IE); Brian O'Loughlin, Bruff (IE); Michael Heelan, Askeaton (IE)

(73) Assignee: Dell Products L.P., Round Rock, TX (US)

( * ) Notice: Subject to any disclaimer, the term of this patent is extended or adjusted under 35 U.S.C. 154(b) by 208 days.

(21) Appl. No.: 14/734,453

(22) Filed: Jun. 9, 2015

(65) Prior Publication Data
US 2016/0366015 A1    Dec. 15, 2016

(51) Int. Cl.
| | |
|---|---|
| *H04W 52/04* | (2009.01) |
| *H04B 17/00* | (2015.01) |
| *G05B 19/02* | (2006.01) |
| *H04W 52/36* | (2009.01) |
| *H04B 17/10* | (2015.01) |
| *H04B 17/12* | (2015.01) |

(52) U.S. Cl.
CPC ............ *H04B 17/00* (2013.01); *G05B 19/02* (2013.01); *H04B 17/102* (2015.01); *H04B 17/12* (2015.01); *H04W 52/367* (2013.01)

(58) Field of Classification Search
None
See application file for complete search history.

(56) References Cited

U.S. PATENT DOCUMENTS

2012/0021800 A1* 1/2012 Wilson ................ H04W 52/146
                                                           455/550.1
2014/0357313 A1* 12/2014 Mercer ................. H04B 1/3838
                                                           455/552.1

OTHER PUBLICATIONS

Federal Communications Commission Office of engineering & Technology, "Evaluating Compliance With FCC Guidelines for Human Exposure to RadioFrequency Electromagnetic Fields", Supplement C, 2001, 53 pgs.
Federal Communication Commission, "Radio Frequency Safety", Printed From Internet May 27, 2015, 3 pgs.
Toit, "Using Proximity Sensing to Meet Mobile Device FCC SAR Regulations", Apr. 2012, 5 pgs.
Antenna Theory, Specific Absorption Rate (SAR), Printed From Internet May 20, 2015, 3 pgs.

(Continued)

*Primary Examiner* — Yemane Mesfin
*Assistant Examiner* — Jeff Banthrongsack
(74) *Attorney, Agent, or Firm* — Egan Peterman Enders Huston

(57) ABSTRACT

Systems and methods are provided that may be implemented to optimize or otherwise control radio module transmit power performance from a given wireless-enabled information handling system platform based on a set of system-specific RF parameter values that are provisioned and stored on the information handling system platform and that uniquely represent particular RF characteristics (e.g., such as specific device environment, system chassis configuration, etc.) of the given information handling system.

20 Claims, 6 Drawing Sheets

(56) References Cited

OTHER PUBLICATIONS

Federal Communications Commission, "Specific Absorption Rate (SAR) for Cell Phones: What It Means for You", Printed From Internet May 20, 2015, 2 pgs.
Federal Communication Commission, "Specific Absorption Rate (SAR) for Cellular Telephones", Printed From Internet May 20, 2015, 2 pgs.

* cited by examiner

SYSTEMS AND METHODS FOR CONTROLLING RADIO TRANSMIT POWER FOR INFORMATION HANDLING SYSTEMS BASED ON SYSTEM-SPECIFIC RF PARAMETERS

FIELD OF THE INVENTION

This invention relates generally to portable information handling systems and, more particularly, to radio power control for wireless transmission from information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The conventional technique for configuring a Wi-Fi wireless radio module for assembly into mobile information handling systems (such as notebook and tablet computer devices) that have different system configurations employs conservative generic radio module operating parameter values that are set within the radio module and that are based on generic system level RF parameter value assumptions. These same conventional radio module operating parameters are then generically applied to all different system configurations, irrespective of the individual RF characteristics of the information handling system platform into which the radio module is being installed. The result is a radio or wireless-enabled computer system that is not optimized for best wireless performance when the computer leaves the factory. For conventional portable computer systems that need to meet bystander specific absorption rate (SAR) requirements, a separate SAR stock keeping unit (SKU) for Wi-Fi needs to be set up, configured and managed. This SAR-compliance process adds cost, complexity, schedule impact and increased time to market risk, especially when considering added complexity of solder-down and connectorized module form-factor variants across system types. Furthermore, the conventional technique for achieving SAR-compliance for assembled computers results in a reduction in wireless performance since a fixed SAR power reduction is applied across all system configurations accepting the Wi-Fi SAR SKU radio module.

FIG. 1 illustrates conventional methodology 100 for manufacturing, configuring and assembling a Wi-Fi wireless radio module to a mobile information handling system. As shown, in step 102 of methodology 100 a given type of wireless radio module is configured during its production with default radio module operating parameters that are generic to all different configurations of mobile information handling systems (e.g., such as different system build configurations and antenna designs customized for the specific system configuration) into which the radio module may be installed. Such conventional radio module operating parameters include radio transmission power values defined in the transmit power calibration table of the radio module. Radio transmission power values may also include SAR power parameter/s that specify a reduced generic fixed radio frequency (RF) transmission power that is also applied irrespective of the specific type of information handling system configuration with which the radio module is assembled. In parallel step 104, a given mobile information handling system platform (sans the radio module) is configured and built (e.g., built by an original design manufacturer "ODM") to include system antennae/s. In step 106 of FIG. 1, the radio module is operatively mated (inserted) into the mobile information handling system platform build cell of step 104 and coupled to the system circuitry and antennae/s. This is followed by a system burn-in process 108, during which the assembled mobile information handling system is powered on and the inserted radio module functionally tested in step 110 via wireless application protocol (WAP) to verify that the system antennae/s have been correctly fitted (coupled) to the radio module. Upon determination that the radio module and system antennas are correctly fitted, then the assembled system with radio module is shipped from the factory or assembly plant in step 112. If in step 110 it is determined that the antenna and radio module are not correctly fitted and operative, then methodology 100 terminates in step 114, and the assembled system is not shipped.

SUMMARY

Disclosed herein are systems and methods that may be implemented to optimize or otherwise control radio module transmit power performance from a given wireless-enabled information handling system platform based on a set of system-specific RF parameter values that are provisioned and stored on the information handling system platform (e.g., in non-volatile memory or other suitable system non-volatile storage device/s) and that uniquely apply to the specific RF characteristics (e.g., particular device environment, particular system chassis configuration, etc.) of the given information handling system. In one exemplary embodiment, the unique system-specific RF parameter values may be stored in a BIOS lookup table maintained on the system platform that may be queried by a processing device in the radio module. The radio module may then self-update (e.g., self-calibrate) its own radio module operating parameters (e.g., transmit power calibration table values) based on information contained in the queried unique system-specific RF parameter values. The disclosed systems and methods may be implemented in one exemplary embodiment to address the reduced performance of conventional Wi-Fi radio modules that are integrated into portable mobile information handling systems (e.g., such as notebook and tablet computer devices) by enabling improved wireless performance and data reach for such assembled systems as they leave or are shipped from an ODM manufacturing or assembly factory.

In one exemplary embodiment, system-specific RF parameter values may be provided as an Advanced Configuration and Power Interface (ACPI) antenna system object that is defined to correspond to the antenna peak gain for the information handling system platform configuration, and that is characterized for the system platform during its development. Such an "actual" peak gain value may be empirically measured, recorded and provisioned on the system platform (e.g., in system non-volatile memory or other suitable system non-volatile storage) at the factory or other assembly point, and then read by the radio module driver (e.g., such as calibration updater logic in the Wi-Fi driver) and used to update the power calibration tables of the radio module for more optimal and/or higher RF transmission output power. This procedure may occur, for example, during a factory configuration process for the information handling system and radio module as part of a factory burn-in stage for the information handling system. In one exemplary embodiment, calibration of the radio module power calibration tables may include: installing an ACPI table of the system-specific RF parameter values (e.g., including system RF parameters such as actual measured system antenna peak gain values) into the system UEFI BIOS, performance of secure authentication checking, loading of software drivers, and using the radio module driver (e.g., calibration updater logic of the Wi-Fi module driver) to read the system-specific RF parameter values from the ACPI table and to update the radio module operating parameter values (e.g., power calibration tables) based on these system-specific RF parameter values.

The disclosed systems and methods may be implemented in one exemplary embodiment to utilize unique system-specific RF parameter values that are based on unique system RF operating characteristics to configure a radio module to achieve improved system wireless performance when installed with a given information handling system platform configuration, and in a manner that is in contrast to conventional Wi-Fi radio module configuration techniques that involve defining a generic radio module SKU with default universal conservative power values for installation in all target information handling system platforms irrespective of the RF operating characteristics of the given system platform into which the radio module is being installed. The disclosed systems and methods may also be implemented in one embodiment without the other disadvantages that result from conventional radio module configuration techniques. These other disadvantages resulting from conventional Wi-Fi module configuration techniques include reduced wireless performance that occurs since a conservative SAR power back-off is conventionally applied across frequency bands, channels and radio operating modes of a given information handling system and therefore does not account for specifics of the individual information handling system platform product environment (e.g., such as individual antenna characteristic/s in the same and different frequencies). The disclosed systems and methods may also be implemented to avoid additional disadvantages that result from conventional Wi-Fi module configuration techniques such as reduced system battery life that results due to the system radio transmit chain and power amplifier (PA) being operated at less than optimal RF chain and PA gain levels for the individual information handling system platform.

In one respect, disclosed herein is an information handling system platform, including: a host processing device; one or more antenna elements; system non-volatile storage containing system-specific radio frequency (RF) parameter values that represent one or more RF characteristics of the mobile information handling system platform; and at least one radio module configured to be coupled to the system non-volatile storage, host processing device and one or more of the antenna elements, the radio module including at least one processing device that is configured to process outgoing data provided from the host processing device to produce and transmit RF signals from one or more of the antenna elements based at least in part on one or more stored radio module operating parameter values. The processing device of the radio module may be further configured to access the system-specific radio frequency (RF) parameter values on the system non-volatile storage and update the stored radio module operating parameters based at least in part on information contained in the accessed system-specific RF parameter values.

In another respect, disclosed herein is a radio module configured for use with an information handling system platform that itself includes a host processing device, system storage and one or more antenna elements. The radio module may include at least one processing device that is configured to: process outgoing data provided from the host processing device to produce and transmit RF signals from one or more of the antenna elements based at least in part on one or more stored radio module operating parameter values; and access system-specific radio frequency (RF) parameter values stored on the system storage and update the stored radio module operating parameters based at least in part on information contained in the accessed system-specific RF parameter values.

In another respect, disclosed herein is a method of configuring an information handling system platform that includes a host processing device, non-volatile system storage and one or more antenna elements. The method may include: storing system-specific radio frequency (RF) parameter values in the system non-volatile storage, the system-specific radio frequency (RF) parameter values representing one or more RF characteristics of the mobile information handling system platform; coupling at least one radio module to the system non-volatile storage, host processing device and one or more of the antenna elements, the radio module including at least one processing device that is configured to process outgoing data provided from the host processing device to produce and transmit RF signals from one or more of the antenna elements based at least in part on one or more stored radio module operating parameter values; and using the processing device of the radio module to access the system-specific radio frequency (RF) parameter values on the system non-volatile storage and update the stored radio module operating parameters based at least in part on information contained in the accessed system-specific RF parameter values.

DESCRIPTION OF ILLUSTRATIVE EMBODIMENTS

Figure 1:
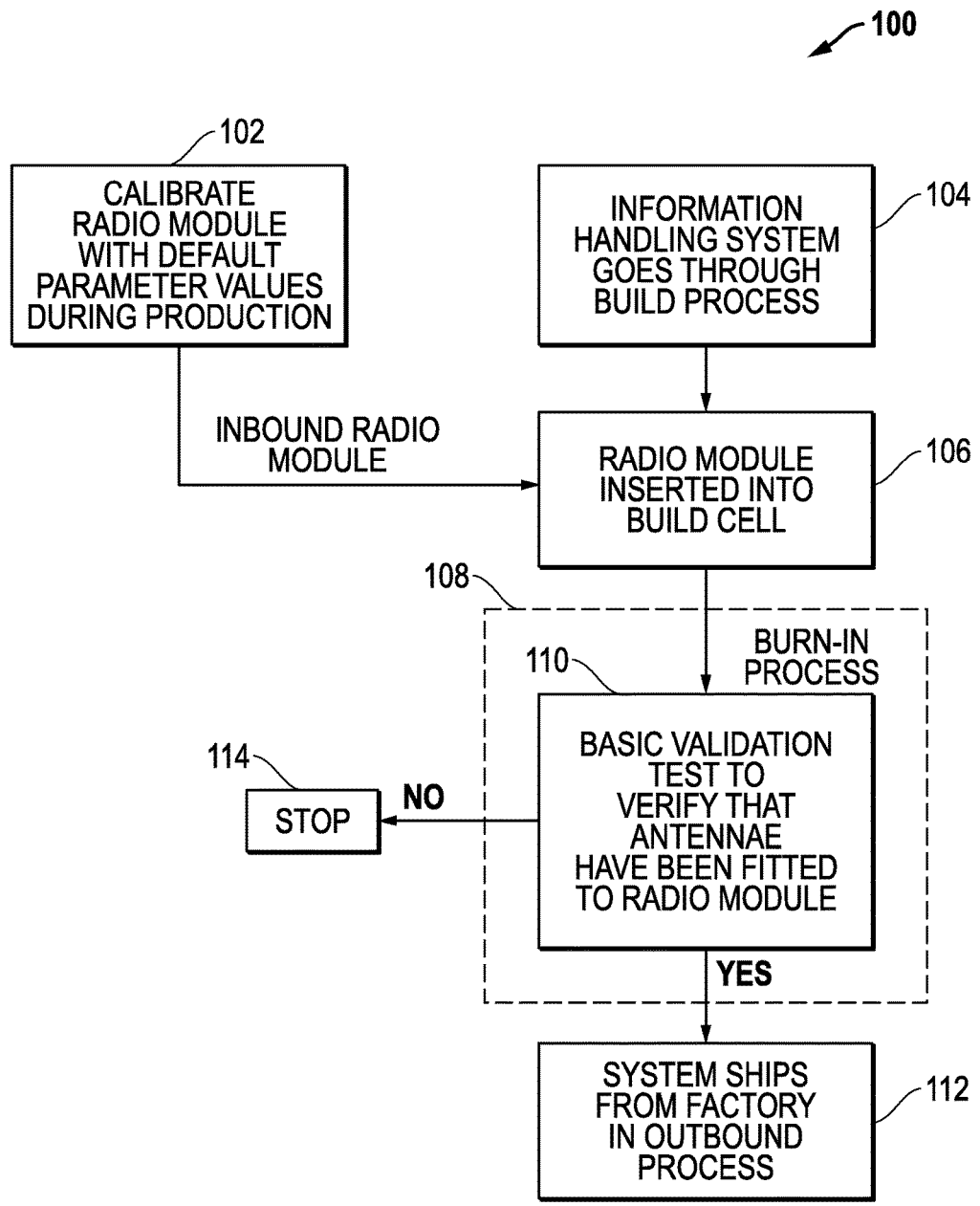
FIG. 1 illustrates conventional methodology or manufacturing, configuring and assembling a Wi-Fi wireless radio module to a mobile information handling system.
Figure 2:
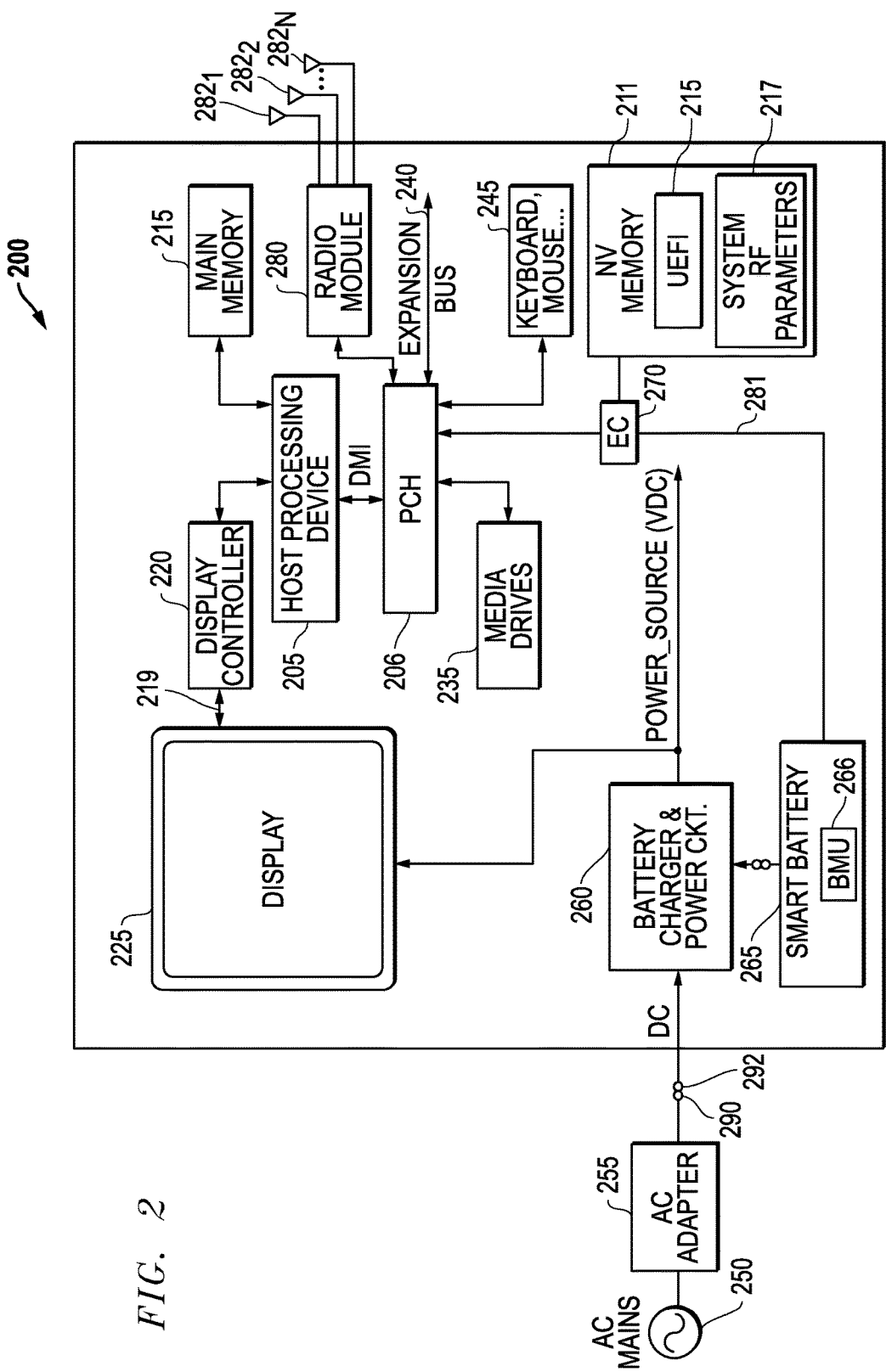
FIG. 2 illustrates a block diagram of an information handling system according to one exemplary embodiment of the disclosed systems and methods.

FIG. 2 is a block diagram of an information handling system 200 (e.g., mobile portable information handling system such as notebook computer, MP3 player, personal data assistant (PDA), cell phone, smart phone, cordless phone, tablet computer, etc.) as it may be configured according to one exemplary embodiment of the disclosed systems and methods. As shown in FIG. 2, information handling system 200 of this exemplary embodiment includes a host processing device 205 (e.g., such as an Intel Pentium series processor, an Advanced Micro Devices (AMD) processor or one of many other processors currently available) which may be optionally coupled together with a platform controller hub (PCH) 206 for some applications. Host processing device 205 may be configured execute an operating system (OS) such as Windows-based operating system, Linux-based operating system, etc. System memory 215 (e.g., DRAM) and a display controller 220 may be coupled as shown to host processing device 205, and a display device 225 (e.g., video monitor) may be coupled to display controller 220 to provide visual images (e.g., via graphical user interface) to the user, e.g., via eDP components 219 such as eDP cable and eDP connector. Media drives 235 may be coupled as shown to host processing device 205 via PCH 206 to provide permanent storage for the information handling system.

Still referring to FIG. 2, an optional expansion bus 240 may be coupled to PCH 206 to provide the information handling system with additional plug-in functionality. Expansion bus 240 may be a PCI bus, PCI Express bus, SATA bus, USB or virtually any other expansion bus. Input devices 245 such as a keyboard and mouse may be coupled via PCH 206 to host processing device 205 to enable the user to interact with the information handling system. A wireless radio module 280 may be coupled to host processing device 205 via PCH 206, and one or more antenna elements (e.g., such as multiple MIMO antenna elements $282_1$ to $282_N$) may in turn be coupled to radio module 280 as shown. An embedded controller (EC) 270 may also be coupled to PCH 206 as shown, and may be configured to perform various tasks such as battery and power management, I/O control, etc. Persistent non-volatile memory storage 211 (e.g., embedded and partitioned flash memory, Electrically Erasable Programmable Read Only Memory—EEPROM, etc.) may be coupled to EC 270 for storing persistent information for EC 270 and other system information, e.g., including Unified Extensible Firmware Interface (UEFI) firmware 215; Advanced Configuration and Power Interface (ACPI) information 217 that may include system-specific RF parameters, tables and runtime environment; as well as other information such as system basic input/output system (BIOS) firmware (e.g., in the form of system management SMBIOS data), etc. It will be understood that other embodiments, non-volatile memory or other non-volatile storage device/s (e.g., such as hard disk drive and/or optical drive, etc.) may also or alternatively be provided elsewhere in system 200 for storing such information, e.g., such as media drives 235.

In the particular embodiment of FIG. 2, information handling system 200 is coupled to an external source of power, namely AC mains 250 through AC adapter 255. It will be understood that external power may be alternatively provided from any other suitable external source (e.g., external DC power source) or that AC adapter 255 may alternatively be integrated within an information handling system 200 such that AC mains 250 supplies AC power directly to information handling system 200. As shown AC adapter 255 is removably coupled to, and separable from, battery charger/power circuit 260 of information handling system 200 at mating interconnection terminals 290 and 292 in order to provide information handling system 200 with a source of DC power to supplement DC power provided by battery cells of a battery system in the form of smart battery pack 265, e.g., lithium ion ("Li-ion") or nickel metal hydride ("NiMH") battery pack including one or more rechargeable batteries and a BMU that includes an analog front end ("AFE") and microcontroller. Further, a battery system data bus (SMBus) 281 is coupled to smart battery pack 265 to provide battery state information, such as battery voltage and current information, from BMU 266 of smart battery pack 265 to EC 270 and to other components such as processor 205. Battery charger/power circuit 260 of information handling system 200 may also provide DC power for recharging battery cells of the battery system 265 during charging operations.

When a battery system of a portable information handling system is optionally provided as a replaceable battery pack, it may be configured for insertion and removal from a corresponding battery pack compartment defined within the chassis of the information handling system (e.g., such as a notebook computer), and may be provided with external power and data connector terminals for contacting and making interconnection with mating power connector terminals and data connector terminals provided within the battery pack compartment to provide power to the system load (i.e., power-consuming components) of the information handling system and to exchange data with one or more processing devices of the information handling system.

Figure 3:
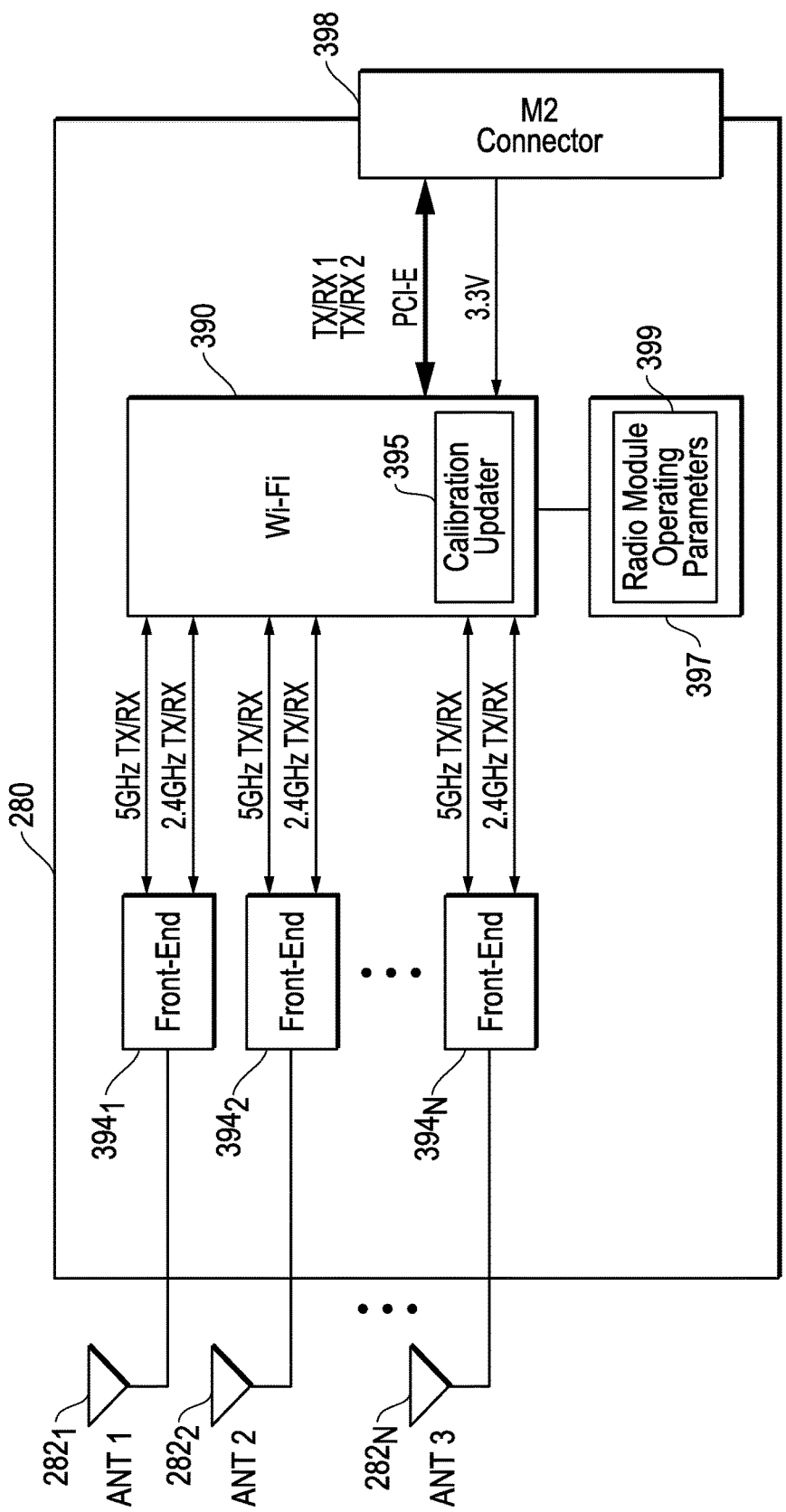
FIG. 3 illustrates a block diagram of a radio module according to one exemplary embodiment of the disclosed systems and methods.

FIG. 3 illustrates a block diagram of one exemplary embodiment of a radio module 280 as it may be installed and coupled to multiple antenna elements $282_1$ to $282_N$ (e.g., MIMO antenna elements) of an information handling system 200. In this embodiment, radio module 280 may be configured to self-update its radio module operating parameter values 399 (e.g., transmit power calibration table values) according to system-specific RF parameter values that are stored in, and read from, other components of an information handling system platform 200 (e.g., such as non-volatile memory components 211 of FIG. 2 or other suitable non-volatile storage component/s). Such stored system-specific RF parameter values may be empirically measured for the given system platform 200 and therefore uniquely represent the specific RF characteristics (e.g., resulting from particular system device environment, particular system chassis configuration, etc.) of the given information handling system platform 200 into which radio module 280 has been installed during system assembly.

Still referring to FIG. 3, radio module 280 includes a single Wi-Fi (e.g., 802.11-based wireless local area network "WLAN") baseband processing device 390 coupled to multiple antenna elements 282, although it will be understood that the disclosed systems and methods may be alternatively implemented with two or more baseband processing devices that are coupled to one or more antenna elements. Moreover, it will be understood that Wi-Fi represents an exemplary RF communication technology only, and that radio modules capable of any one or more RF communication technologies (e.g., including Bluetooth) may be employed using the disclosed systems and methods. In this embodiment, components of radio module 280 may be provided as an expansion card on a printed circuit board (PCB) with a suitable connector (e.g., such as M.2 edge connector) 398 that provides interconnection for radio module 280 to power circuit 260, as well as to PCH 206 and host processing device 205, via a mating edge connector. In this embodiment Wi-Fi baseband processing device communicates with host processing device 205 via PCI Express (PCI-e) data bus, although any other suitable data communication interface (e.g., such as USB) between radio module/s and host processing device/s may be employed.

Also shown in FIG. 3 are RF transceiver front ends 394$_1$ to 394$_N$ that are coupled between 802.11-based Wi-Fi baseband processing device 390 and respective antenna elements 282$_1$ to 282$_N$. Each of RF transceiver front ends 394$_1$ to 394$_N$ exchange 2.4 GHz (e.g., Wi-Fi 802.11ac and 802.n) and 5 GHz Wi-Fi (e.g., 802.11ac and 802.11n) transmit and receive signals with Wi-Fi baseband processing device 390 as shown. Each of radio transceiver front ends 394 may be configured to perform intermediate frequency (IF) to RF up conversion mixing, amplification and RF processing tasks for outgoing transmitted signals to antennas 282, and vice-versa (including down conversion) for incoming received signals from antennas 282. Besides IF, each transceiver front end 394 may perform up conversion and down conversion between RF and other suitable frequencies for processing by baseband processing device 390, e.g., such as zero-IF frequency, baseband frequency, etc. In this regard, baseband processing device 390 (e.g., digital signal processor "DSP" or other suitable RF module or processing device/s) may be coupled to exchange outgoing and incoming IF or other suitable signals with transceiver front end 394 through respective digital-to-analog (DAC) and analog-to-digital (ADC) converters (not shown). Baseband processing device 390 may be configured to manage RF signal transmission and reception, as well as to perform tasks including signal processing, encoding, frequency shifting and/or modulation operations to provide transmitted information in outgoing signals based on digital data provided by host processing device 205, and to perform signal processing, decoding, frequency shifting and/or demodulation operations to obtain the message content in the incoming signals as digital data to provide to host processing device 205.

As further shown in FIG. 3, baseband processing device 390 may also be configured to execute or otherwise implement calibration updater logic 395 (e.g., as part of a radio module driver) to self-update (e.g., self-calibrate) its transmit power calibration information (e.g., power calibration table values) according to system-specific RF parameter values that are stored in, and read from, other components of a given information handling system platform 200 across connector 398. In this regard, it will be understood that the same configuration of radio module 280 may be installed in information handling system platforms having different chassis configurations that each have different RF characteristics, such as result from different system device environment, different system chassis configuration, etc. For example, a particular platform chassis configuration of a given information handling system may affect individual system RF characteristics (e.g., such as peak antenna transmit gain and/or SAR characteristics) due to the location, type, number and/or spacing of transmit antenna elements as they are mounted relative to the system chassis which includes the outer shell or cover (e.g., lid and base of a notebook computer) as well as the inner frame of the platform to which system components may be mounted. Other chassis configuration aspects that may affect individual system RF characteristics include, but are not limited to, lengths and/or routing paths of RF coaxial cables which may vary depending on the configuration of the system components. Yet other chassis configuration aspects that may affect individual system RF characteristics include, but are not limited to the external chassis material (e.g., plastic outer shell versus metal outer shell), size and/or shape of outer footprint of the information handling system chasses, etc. Examples of different types of system device environments that may result in different individual system RF characteristics include, but are not limited to, read device usage environment and/or device usage modes of operation. In this regard, the different usages may have different antenna/RF performance specifications with different RF system parameter values. System RF characteristics may also vary with changes in the noise floor of the system, depending on the noise-level contribution of the system configuration components.

Figure 4:
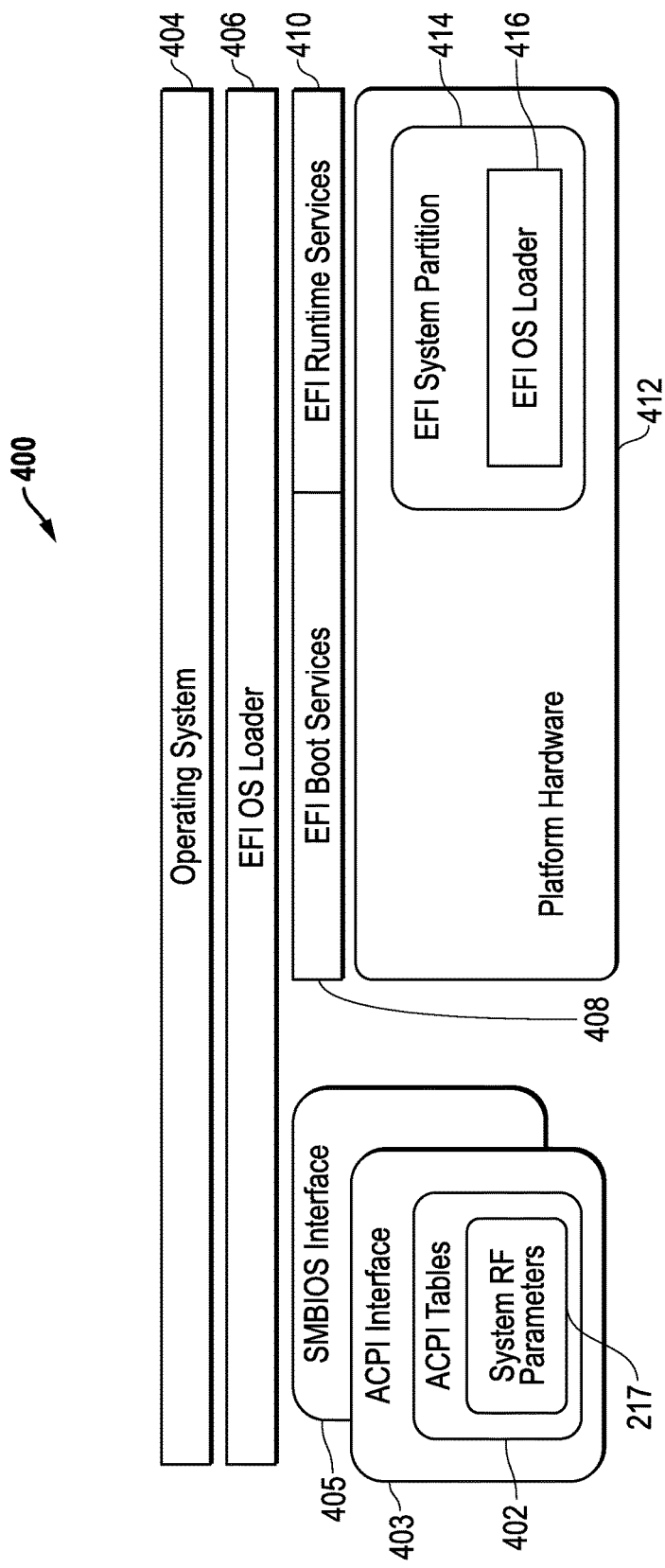
FIG. 4 illustrates high level firmware and software architecture according to one exemplary embodiment of the disclosed systems and methods.

FIG. 4 illustrates high level firmware and software architecture 400 as it may be maintained in non-volatile storage of an information handling system platform, e.g., such as in non-volatile memory 211 and/or media drives 235 of information handling system 200 of FIG. 2. In FIG. 4, platform hardware 412 may be hardware components of information handling system 200 of FIG. 2. Other components of architecture 400 may be implemented in one embodiment as software that is stored in non-volatile memory (e.g., flash memory, Electrically Erasable Programmable Read Only Memory—EEPROM, etc.) or in other non-volatile storage such as media drives 235. As illustrated in FIG. 4, architecture 400 may include EFI system partition 414 that includes EFI loader 416 that is maintained on system hardware 412 which may include non-volatile memory 211 in FIG. 2. As shown, architecture 400 includes EFI boot services 408 and EFI runtime services 410, as well as EFI operating system (OS) loader 406 and operating system 404 that may be loaded and executed, e.g., by host processing device 205. Architecture 400 also includes ACPI interface 403 that itself includes ACPI tables 402 which in turn include system-specific RF parameter values 217 (e.g., actual measured system antenna peak gain). Other components that may also be present in architecture 400 are system management BIOS interface 405. In the embodiment of FIG. 2, software and firmware components of architecture 400 may be accessed and executed by host processing device 205 and/or radio module 280. In particular, host processing device 205 may access and execute components 408, 410, 406 and 404; while radio module 280 may access and utilize system RF parameter values 217 in a manner as described elsewhere herein.

Figure 5:
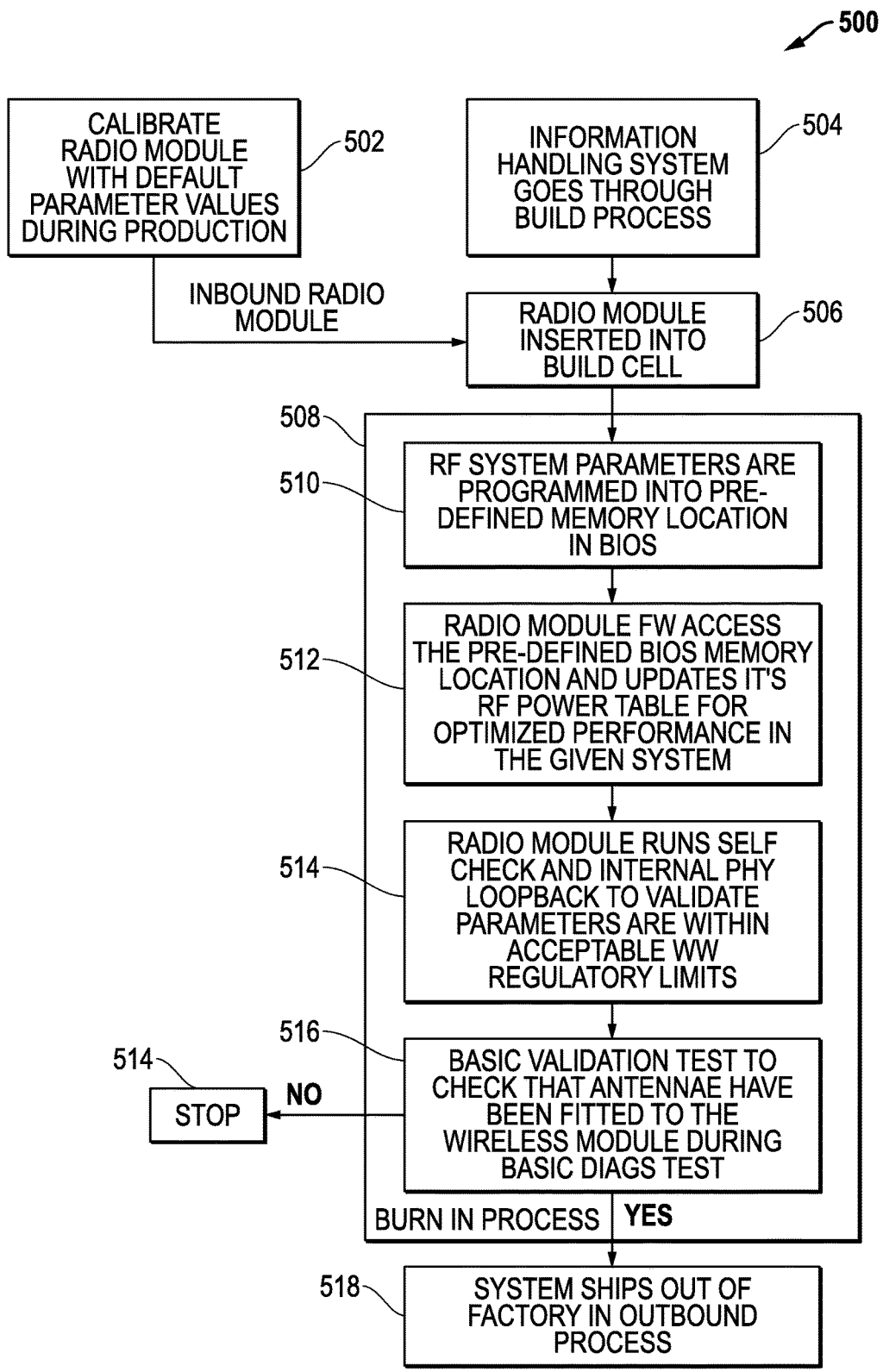
FIG. 5 illustrates methodology for manufacturing, configuring and assembling a wireless radio module to other components of a mobile information handling system platform according one exemplary embodiment of the disclosed systems and methods.
Figure 6:
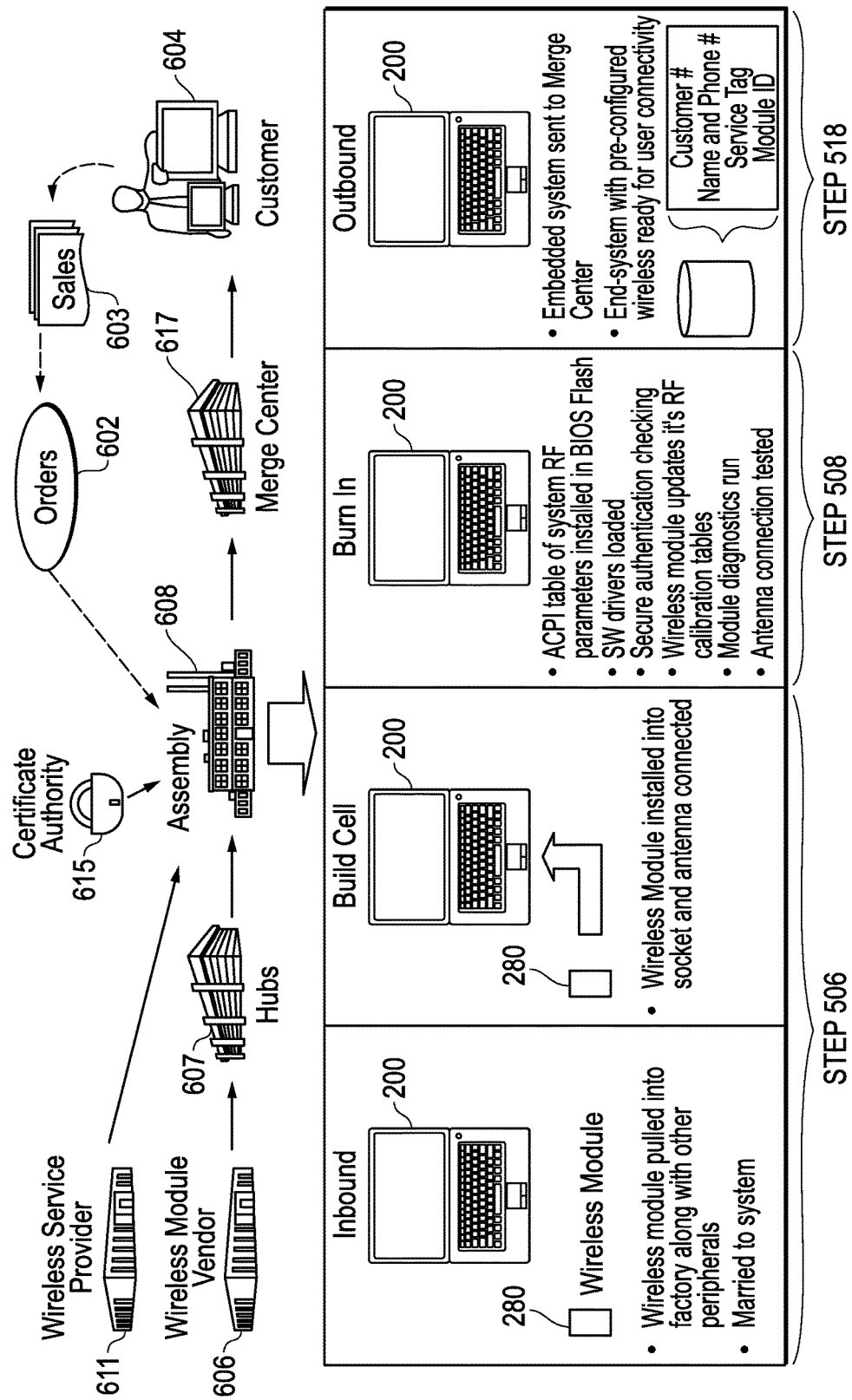
FIG. 6 illustrates methodology for manufacturing, configuring and assembling a wireless radio module to other components of a mobile information handling system platform according one exemplary embodiment of the disclosed systems and methods.

FIGS. 5 and 6 together illustrate an exemplary embodiment of methodology for manufacturing, configuring and assembling a wireless radio module to other components of a mobile information handling system platform according to one exemplary embodiment of the disclosed systems and methods. Note that for illustration purposes, steps of FIGS. 5 and 6 are described herein in relation to information handling system 200 and radio module 280 of FIGS. 2 and 3. However, it will be understood that similar methodology may be implemented with other information handling system and/or radio module configurations.

In one embodiment, the methodology of FIGS. 5 and 6 may be performed to factory pre-configure a wireless information handling system platform 200 for "out-of-the-box" wireless connectivity service, e.g., in response to an order 602 received via sales 603 from a customer 604 as shown in FIG. 6. In one embodiment, a given order 602 may specify or define a combination of different information handling system components and/or component types that are selected ala carte for assembly by a customer 604 or other type of user. Examples of such information handling system components include, but are not limited to, different wireless radio module frequency/protocol capability and combinations of these capabilities (e.g., Wi-Fi, Bluetooth, wireless wide area network "WWAN", etc.), different number of antennas 282, different material and style of notebook or tablet computer chassis, etc. In this regard, each different defined combination of different information handling system components and/or component types may result in a given configuration of an information handling system 200 that has different unique system RF operating characteristics, such as unique antenna peak gain characteristics, etc.

Referring now to FIG. 5, in step 502 of methodology 500 a given type of wireless radio module 280 is configured during its production (e.g., by wireless module vendor 606 shown in FIG. 6) with default radio module operating parameters 399 that are generic to all different configurations of mobile information handling systems 200 (e.g., such as different system build configurations and/or antenna designs customized for the specific system configuration) into which the radio module 280 may be installed. Examples of such conventional radio module operating parameters include radio transmission power values defined in the transmit power calibration table of the radio module that are to be used to limit the power transmission levels of the radio module 280. Radio transmission power values may include SAR power parameter/s that specify a generic fixed radio frequency (RF) transmission power reduction for any type of information handling system configuration with which the radio module is assembled.

In parallel step 504, a given mobile information handling system platform 200 (sans the radio module) is configured and built (e.g., built by an original design manufacturer "ODM" or other type manufacturer in assembly factory 608) to include system antennae/s 282. In step 506 of FIG. 5, an inbound radio module 280 is pulled into the assembly factory 608, e.g., via one or more hubs 607 as illustrated in FIG. 6. In assembly factory 608, inbound radio module 280 may be married with and operatively mated (inserted) using connector 398 into a mating connector of the build cell of mobile information handling system platform 200 of step 504. In this step, radio module 280 is coupled to the system circuitry, including host processing device 205, system non-volatile memory 211, and antennae/s 282 of system 200.

Still referring to FIGS. 5 and 6, a system burn-in process 508 may be next performed during which the assembled mobile information handling system 200 is powered on and the inserted radio module 280 functionally tested via wireless application protocol (WAP) to verify that the system antennae/s 282 have been correctly fitted (coupled) to the radio module 280. Also during burn-process 508, system-specific RF parameter values 217 may be retrieved by the baseband processing device of the radio module and used to update its own radio module operating parameters 399 maintained in internal (e.g., integrated) non-volatile storage 397 of radio module 280 that is coupled internally to processing device 390, or in other non-volatile storage coupled externally to the baseband processing device. In this regard, radio module operating parameters 399 may be stored, for example, in non-volatile memory (e.g., flash memory, Electrically Erasable Programmable Read Only Memory—EEPROM, etc.) or in other non-volatile storage such as media drives 235. It will also be understood that in other embodiments system-specific RF parameter values 217 may be retrieved by or otherwise provided to a radio module 280 at any other suitable time other than during burn-in process 508.

In one embodiment, system-specific RF parameter values 217 representing specific RF characteristics of an individual system platform may be empirically measured across the full RF transmit frequency range during the development process (e.g., all system RF parameters and performance may be fully characterized in the laboratory environment) for a particular configuration of information handling system platform 200 being built (e.g., a particular notebook computer design with particular number, location, spacing and/or types of antennas, a particular tablet computer design with particular number, location, spacing and/or types of antennas, etc.). Examples of such measured system RF parameter values include, but are not limited to, actual measured system antenna peak gain (e.g., 3 dBi), actual measured system antenna isolation (e.g., 22 dB), actual measured system radiation pattern (e.g., azimuth gain coverage), etc.

Specifically, burn-in process 508 of FIGS. 5 and 6 may begin with step 510 where system-specific RF parameter values may be programmed (e.g., stored) into a pre-defined memory location 217 of non-volatile memory 211 (e.g., in a BIOS Flash lookup table as shown in FIGS. 5 and 6) that is maintained on the system platform 200 and that may be queried by a processing device 390 in the radio module 280. Then in step 512, processing device 390 of radio module 280 may execute calibration updater 395 to access the system-specific RF parameter values in pre-defined memory location 217 of non-volatile memory 211, and then update its radio module operating parameters 399 (e.g., radio module RF transmit power calibration table values) according to or based on the queried unique system-specific RF parameter/s 217. In one exemplary embodiment, calibration updater 395 may be executed processing device 390 to perform step 512 by updating values of a RF transmit power table of radio module 280 based on the retrieved system-specific RF parameter values for optimized transmit performance from the given system platform 200. In one exemplary embodiment, other components to enable out-of-the-box connectivity for a given platform configuration of system 200 may be optionally provided during step 508, e.g., such as software and/or firmware 611 and/or access codes from wireless service provider 611, certificate of authority 615, etc.

Next, in step 514, processing device 390 of radio module 280 may run a self-check and an internal PHY loopback to validate that the newly calibrated RF transmit power parameter values of the radio module RF transmit power table 399 are within acceptable worldwide (WW) regulatory limits, etc. In this regard, worldwide regulatory limits are made up of the supported country set of limits established by national regulatory authorities such as the FCC in the US, IC in Canada, MIC in Japan, KCC in South Korea, MII in China, etc. This is followed by step 516, during which the assembled mobile information handling system 200 is powered on and the inserted radio module 280 functionally tested (e.g., via wireless application protocol (WAP)) to verify that the system antennae/s 282 have been correctly fitted (coupled) to the radio module. Upon determination that that the radio module 280 and system antennas 282 are correctly fitted, then the assembled system 200 with radio module 280 is shipped outbound from the factory or assembly plant in step 518, e.g., to merge center 617 for packaging and shipping of the assembled system 200 to customer 604 as an end system having pre-configured wireless capability and ready for user wireless connectivity. However, if in step 516 it is determined that the antenna/s 282 and radio module 280 are not correctly fitted and operative, then methodology 500 terminates in step 514, and the assembled system 200 is not shipped.

It will be understood that the particular exemplary illustrated steps and order of steps of methodology 500 are exemplary only, and that any other combination of additional, fewer and/or alternative steps or step order may be employed that is suitable to optimize or otherwise control radio module transmit power performance from a wireless-enabled information handling system platform based on one or more system-specific RF parameter values 217 (e.g., as a set of system-specific RF parameter values) that are provisioned and stored in the information handling system platform, and that uniquely represent RF characteristics of the platform (e.g., such as specific device environment, system chassis configuration, etc.). For example, it is possible that the RF system parameters 217 may be stored into system non-volatile memory 211 before step assembly of radio module 280 to system 200 in step 506. It is also possible that radio module 280 may dynamically and in real time update its radio module operating parameters 399 at a time after system manufacture, e.g., such as when a radio module is operatively mated with an information handling system 200 by an end user such as customer 604.

In one embodiment ACPI objects may be populated under all PCI root spaces of ACPI tree in a radio module vendor's reference code, so that system-specific RF parameters 217 may be placed under any slot. In such an embodiment, a radio module vendor 606 may add an additional object to be populated, and the calibration updater 395 of the radio driver of a radio module 280 may read the system-specific RF parameter object 217 (e.g., "peak gain modifier" for each of Antennas 1, 2 and 3 as specified below) during the radio module initialization process and based on the read parameters 217 configure output power for a particular frequency band (e.g., Wi-Fi) with antenna system gain to corresponding applicable (e.g., Wi-Fi) regulatory limits as shown below.

```
Name (ANT, Package( )
{         //Field Name              Field Type
    Revision,                     // DWordConst
    Package( )                    // System Antenna Parameters 1
    {
        Antenna1,     // Antenna 1 peak gain modifier
        Antenna2,     // Antenna 2 peak gain modifier
        Antenna3     // Antenna 3 peak gain modifier
    },
}) // End of ANT object
```

Table 1 below illustrates example improvement in RF transmit performance from an assembled information handling system 200 resulting from methodology 500 of FIGS. 5 and 6.

TABLE 1

| Center Frequency | Center Channel | Default Generic Worldwide SKU (Based on assumed 5 dBi antenna peak gain) | | Default Generic SAR SKU With Reduced Power (Based on assumed 5 dBi antenna peak gain) | | Actual Measured Antenna peak Gain For the Given System | | Improved Transmit Power Levels (Default SAR SKU values + 2 dBi difference between generic and actual antenna peak gain values) | |
|---|---|---|---|---|---|---|---|---|---|
| | | SISO $282_1$ (WW) | SISO $282_2$ (WW) | SISO $282_1$ (FCC SAR) | SISO $282_2$ (FCC SAR) | Ant $282_1$ Peak Gain | Ant $282_2$ Peak Gain | SISO $282_1$ New Process | SISO $282_2$ New Process |
| 5610 | 122ac80 | 13.5 | 13.5 | 12 | 12 | 3 | 3 | 14 | 14 |
| 5690 | 138ac80 | 15 | 15 | 12 | 12 | 3 | 3 | 14 | 14 |
| 5775 | 155ac80 | 15 | 15 | 12 | 12 | 3 | 3 | 14 | 14 |

Table 1 illustrates the difference between default system transmit power levels for a given radio module and the resulting improved system transmit power levels that may be achieved using the methodology of FIGS. 5 and 6. Specifically, the first and second columns of Table 1 give the single-input-single-output (SISO) 5 GHz band channel power calibration values (e.g., generic worldwide SKU and generic Wi-Fi reduced power FCC SAR SKU values) initially programmed by a radio module vendor 606 into a given Wi-Fi radio module 280 as default radio module operating parameters 399 for two system antennas 282₁ and 282₂ at three different center frequencies. In this example, these default SKU values of Table 1 are based on the vendor of this radio module using an assumed fixed 5 dBi antenna peak gain value for the 5 GHz band when used with any mated configuration of an information handling system 200. The 5 dBi antenna peak gain value may also be programmed in step 502 as default radio module operating parameters 399 of radio module 280 for later retrieval and use by calibration updater 395 as will be described below. It will be understood that the values of Table 1 are exemplary only, and that it is possible that the various transmit power levels and/or peak antenna gain values may be different for different antennas and/or different center frequencies. In this regard, different individual antennas 282 of an information handling system 200 may be custom tuned and different system-specific RF parameters 217 may be provided for each different antenna 282 such that the resulting update radio module operating parameters 399 may themselves result in optimized different transmit power level values for each different system antenna 282.

In the example of Table 1, the actual antenna peak gain for the 5 GHz Wi-Fi band is empirically measured to be 3 dBi for a particular platform configuration of information handling system 200, which is 2 dBi lower than the vendor-assumed value of 5 dBi. Thus, this actual 3 dBi measured system antenna peak gain may in step 510 be programmed (e.g., using burn-in test equipment) as system operating parameters 217 into non-volatile memory 211 of the given system 200. Then, processing device 390 may execute the calibration updater 395 of mated radio module 280 in step 512 to access and read the 3 dBi actual antenna peak gain values 217 from system non-volatile memory 211 to determine the 2 dBi difference between the default generic assumed antenna peak gain of 5 dBi and the actual system antenna peak gain of 3 dBi. Processing device 390 may then execute the calibration updater 395 to update the SISO A and SISO B transmit levels by adding the determined 2 dBi difference in antenna peak gain to the generic Wi-Fi reduced power FCC SAR SKU values (12 dBi in this case) to arrive at a new optimized calibrated SAR-compliant transmit power level of 14 dBi for each antenna and center frequency as shown. This new updated SAR-compliant transmit power level of 14 dBi may then be used by radio module 280 (i.e., rather than the original default 12 dBi power level) for actual transmission power for the assembled system 200 when it is operated by an end user (e.g., customer 604).

Where FCC SAR values are not applicable to a given system, the WW SKU values may be similarly incremented by 2 dBi (e.g., to 15.5 and 17 dBi values). Thus, using the methodology of FIGS. 5 and 6, the Wi-Fi radio module transmit power for the 5 GHz Wi-Fi frequency band channels can be safely increased by 2 dB (i.e., the difference between the fixed 5 dBi antenna peak gain value used by the radio module vendor and the actual 3 dBi peak gain measured for the system 200 by the system designer or manufacturer), enabling better out-of-the-box wireless performance for the shipped device. It will also be understood that radio module operating parameters 399 may take any form suitable for varying the maximum transmit power of a radio module besides RF transmit power parameter values of a transmit power calibration table, and/or that system-specific RF parameter values may be of any form suitable for representing the actual RF transmission characteristics (e.g. antenna gain, isolation, radiation power, etc.) of a given system design. For example, in one alternative embodiment, system-specific RF parameter value/s 217 may be provided in the form of maximum transmit power value/s to be used for RF transmission from one or more antennas 282 of a given system 200, and a radio module 280 may retrieve these maximum transmit power value/s from system non-volatile memory 211 and directly employ these maximum transmit power value/s for controlling RF transmission power from system antenna/s 282.

It will also be understood that one or more of the tasks, functions, or methodologies described herein (e.g., including those described herein for components 205, 280, 270, 390, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system platform, comprising:
a host processing device;
one or more antenna elements;
system non-volatile storage containing system-specific radio frequency (RF) parameter values that represent one or more RF characteristics of the mobile information handling system platform; and
at least one hardware radio module configured to be coupled to the system non-volatile storage, host processing device and one or more of the antenna elements when installed into the information handling system, the hardware radio module including at least one processing device separate from the host processing device that is configured to process outgoing data provided from the host processing device to produce and transmit RF signals from one or more of the antenna elements based at least in part on one or more stored radio module operating parameter values;

where the separate processing device of the radio module is further configured to access the system-specific radio frequency (RF) parameter values on the system non-volatile storage and update the stored radio module operating parameters based at least in part on information contained in the accessed system-specific RF parameter values; and where the system-specific radio frequency (RF) parameter values uniquely represent the specific RF characteristics of the particular given information handling system platform into which the radio module is configured to be installed.

2. The information handling system platform of claim 1, where the system-specific RF parameter values comprise antenna peak gain for at least given one of the antenna elements; and where the radio module operating parameters comprise transmit power level for the given antenna element.

3. The information handling system platform of claim 1, where the radio module further comprises integrated non-volatile storage separate from the system non-volatile storage; and where the stored radio module operating parameter values are maintained on the integrated non-volatile storage of the radio module.

4. The information handling system platform of claim 1, where information handing system platform has a given system platform chassis configuration; and where the system-specific RF parameter values are empirically measured values for the given system platform chassis configuration that are empirically measured, recorded and provisioned on the system platform before the radio module is installed into the system platform.

5. The information handling system platform of claim 4, where the processing device of the radio module is further configured to access the system-specific RF parameter values on the system non-volatile storage during installation of the radio module into the system platform; and to update the stored radio module operating parameters by replacing pre-existing stored default radio module operating parameters with radio module operating parameters that are different than the pre-existing stored default radio module operating parameters based at least in part on information contained in the accessed system-specific RF parameter values.

6. The information handling system platform of claim 1, where the at least one radio module comprises a 802.11-based Wi-Fi radio module that includes at least one processing device that is configured to process outgoing data provided from the host processing device to produce and transmit 802.11-based Wi-Fi RF signals from the one or more of the antenna elements based at least in part on one or more stored radio module operating parameter values; and where the system-specific radio frequency (RF) parameter values are included in an Advanced Configuration and Power Interface (ACP') table in a system basic input/output system (BIOS) stored on the system non-volatile memory.

7. The information handling system platform of claim 1, where the at least one radio module is coupled to the system non-volatile storage, host processing device and one or more antenna elements; and where the separate processing device of the radio module is a baseband processing device.

8. The information handling system platform of claim 1, where the information handling system is a mobile information handling system having a platform configuration that is a notebook computer or a tablet computer.

9. A hardware radio module configured for installation into use with an information handling system platform that itself includes a host processing device, system storage and one or more antenna elements, the hardware radio module comprising at least one processing device separate from the host processing device that is configured to perform the following when installed into the information handling system:

process outgoing data provided from the host processing device to produce and transmit RF signals from one or more of the antenna elements based at least in part on one or more stored radio module operating parameter values; and access system-specific radio frequency (RF) parameter values stored on the system storage and update the stored radio module operating parameters based at least in part on information contained in the accessed system-specific RF parameter values where the system-specific radio frequency (RF) parameter values uniquely represent the specific RF characteristics of the particular given information handling system platform into which the radio module is configured to be installed.

10. The radio module of claim 9, where the system-specific RF parameter values comprise antenna peak gain for at least given one of the antenna elements; and where the radio module operating parameters comprise transmit power level for the given antenna element.

11. The radio module of claim 9, where the radio module further comprises integrated non-volatile storage separate from non-volatile storage of the system platform; and where the stored radio module operating parameter values are maintained on the integrated non-volatile storage of the radio module.

12. The radio module of claim 9, where the processing device of the radio module is further configured to access the system-specific RF parameter values on the system storage during installation of the radio module into the system platform; and to update the stored radio module operating parameters by replacing pre-existing stored default radio module operating parameters with radio module operating parameters that are different than the pre-existing stored default radio module operating parameters based at least in part on information contained in the accessed system-specific RF parameter values.

13. The radio module of claim 9, where the at least one radio module comprises a 802.11-based Wi-Fi radio module.

14. A method of configuring an information handling system platform that includes a host processing device, non-volatile system storage and one or more antenna elements, the method comprising:

storing system-specific radio frequency (RF) parameter values in the system non-volatile storage, the system-specific radio frequency (RF) parameter values representing one or more RF characteristics of the mobile information handling system platform;

installing at least one separate hardware radio module into the system platform and coupling the at least one hardware radio module to the system non-volatile storage, host processing device and one or more of the antenna elements, the hardware radio module including at least one processing device separate from the host processing device that is configured to process outgoing data provided from the host processing device to produce and transmit RF signals from one or more of the antenna elements based at least in part on one or more stored radio module operating parameter values; and using the separate processing device of the radio module to access the system-specific radio frequency (RF)

parameter values on the system non-volatile storage and update the stored radio module operating parameters based at least in part on information contained in the accessed system-specific RF parameter values;

where the system-specific radio frequency (RF) parameter values uniquely represent the specific RF characteristics of the particular given information handling system platform into which the radio module is installed.

15. The method of claim 14, where the system-specific RF parameter values comprise antenna peak gain for at least given one of the antenna elements; and where the radio module operating parameters comprise transmit power level for the given antenna element.

16. The method of claim 14, where information handling system platform has a given system platform chassis configuration; where the system-specific RF parameter values are empirically measured values for the given system platform chassis configuration; and where the method further comprises empirically measuring, recording and provisioning the system-specific RF parameter values on the system platform before installing the radio module into the system platform.

17. The method of claim 14, further comprising using the separate processing device of the radio module to:
  access the system-specific RF parameter values on the system non-volatile storage during installation of the radio module into the system platform; and
  then update the stored radio module operating parameters by replacing pre-existing stored default radio module operating parameters with radio module operating parameters that are different than the pre-existing stored default radio module operating parameters based at least in part on information contained in the accessed system-specific RF parameter values.

18. The method of claim 14, further comprising using the at least one separate processing device of the radio module to process outgoing data provided from the host processing device to produce and transmit RF signals from the one or more of the antenna elements based at least in part on one or more stored radio module operating parameter values; and where the separate processing device of the radio module is a baseband processing device.

19. The method of claim 14, further comprising using the separate processing device of the radio module to update the stored radio module operating parameters after system manufacture in real time in response to installation of the radio module into the system platform by an end user.

20. The method of claim 14, further comprising performing the following steps in an assembly factory:
  storing the system-specific radio frequency (RF) parameter values in the system non-volatile storage during system burn-in process in the assembly factory, and assembling the at least one radio module to the host processing device, non-volatile system storage and one or more antenna elements of the information handling system; and
  then using the processing device of the radio module to access the system-specific RF parameter values on the system non-volatile storage and to update the stored radio module operating parameters based at least in part on information contained in the accessed system-specific RF parameter values.

* * * * *

UNITED STATES PATENT AND TRADEMARK OFFICE
CERTIFICATE OF CORRECTION

PATENT NO.        : 9,853,748 B2
APPLICATION NO.   : 14/734453
DATED             : December 26, 2017
INVENTOR(S)       : Liam Prendergast et al.

Page 1 of 1

It is certified that error appears in the above-identified patent and that said Letters Patent is hereby corrected as shown below:

In the Claims

In Claim 6, Column 15, Line 54, delete "(ACP')" and insert --(ACPI)--

Signed and Sealed this
Fifth Day of June, 2018

Andrei Iancu
*Director of the United States Patent and Trademark Office*